United States Patent [19]
Iwata et al.

[11] Patent Number: 5,146,379
[45] Date of Patent: Sep. 8, 1992

[54] THIN FILM MAGNETIC HEAD

[75] Inventors: Tetsuya Iwata; Yutaka Sakurai, both of Nagaoka, Japan

[73] Assignee: Alps Electric Co., Ltd., Tokyo, Japan

[21] Appl. No.: 707,730

[22] Filed: May 30, 1991

[30] Foreign Application Priority Data

May 30, 1990 [JP] Japan .................................. 2-140719
Jun. 13, 1990 [JP] Japan .................................. 2-154452

[51] Int. Cl.$^5$ ........................................... G11B 5/147
[52] U.S. Cl. .................................................. 360/126
[58] Field of Search ............... 360/126, 125, 120, 127

[56] References Cited

U.S. PATENT DOCUMENTS

5,027,246  6/1991  Numazawa et al. ................ 360/126
5,063,467 11/1991  Colineau et al. .................... 360/120

*Primary Examiner*—David J. Severin
*Attorney, Agent, or Firm*—Guy W. Shoup; B. Noel Kivlin

[57] ABSTRACT

A thin film magnetic head of the present invention comprises an insulating layer and a protective layer both of which are made of a magnetic material or a nonmagnetic material containing a magnetic material so as to inhibit the contour effect which is a trouble in making an attempt to increase the recording density.

4 Claims, 9 Drawing Sheets

THIN FILM MAGNETIC HEAD

BACKGROUND OF THE INVENTION

The present invention relates to a thin film magnetic head produced by a technique of forming thin films.

DESCRIPTION OF THE PRIOR ART

Figure 7:
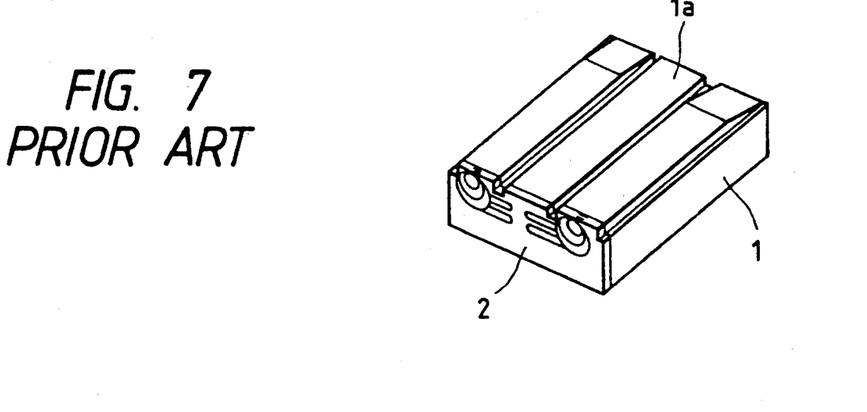
FIG. 7 is a schematic perspective view showing the whole arrangement.

FIG. 7 shows an example of conventional thin film magnetic heads of this type. The thin film magnetic head shown in FIG. 7 comprises a thin film magnetic head element 2 formed by photolithography and provided on the front side of a slider 1 having a bottom 1a (shown as an upper side in FIG. 7) disposed opposite to a medium such as a magnetic disk or the like.

Figure 8:
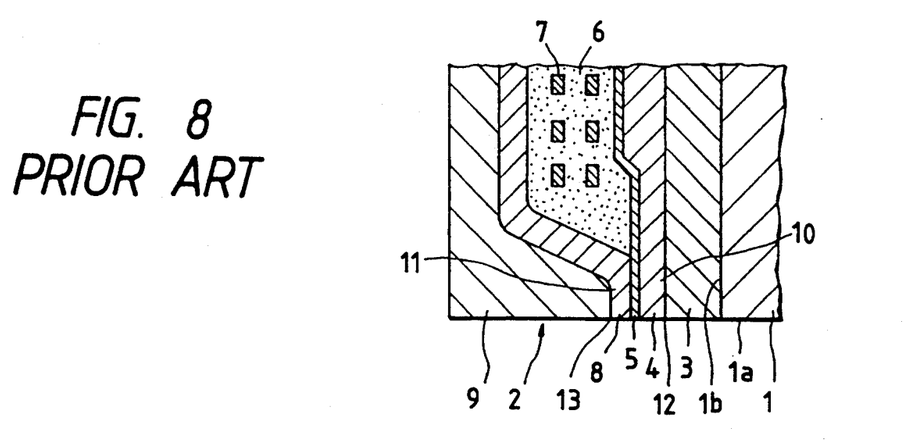
FIG. 8 is an enlarged sectional view of a principal portion of a thin film magnetic head element.

As shown in a detailed sectional view of a principal portion in FIG. 8, the thin film magnetic head element 2 comprises an insulating layer 3, a lower magnetic layer (lower core) 4, a gap layer 5, a coil conductor 7 enclosed with an insulating layer 6, an upper magnetic layer (upper core) 8 and a protective layer (overcoat layer) 9, all of which are laminated in turn on the front side 1b of the slider 1 serving as a substrate, the magnetic layers 4 and 8 being laminated with the gap layer therebetween so that the end portions of the magnetic layers 4, 8 respectively serve as a pair of magnetic poles 10, 11.

In this case, the lower magnetic layer 4 and the upper magnetic layer 8 are made of a ferromagnetic material such as permalloy or the like, and both the insulating layer 3 and the protective layer 9 are made of a non-magnetic material consisting of an oxide such as $Al_2O_3$, $SiO_2$ or the like.

SUMMARY OF THE INVENTION

The above-mentioned thin film magnetic head has the problems below caused by the magnetic characteristics thereof.

Figure 9:
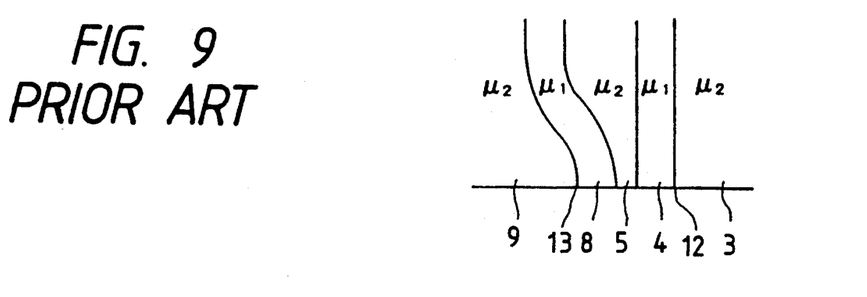
FIG. 9 is a schematic drawing of a principal portion of the same.
Figure 10:
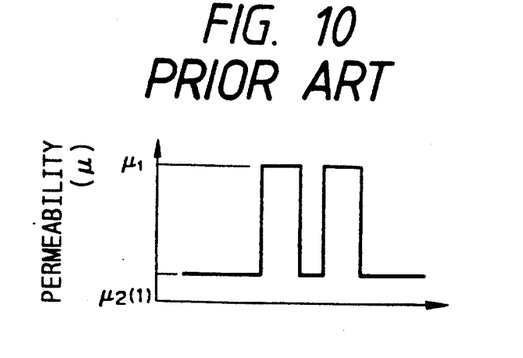
FIG. 10 is a drawing showing the distribution of permeability.
Figure 11:
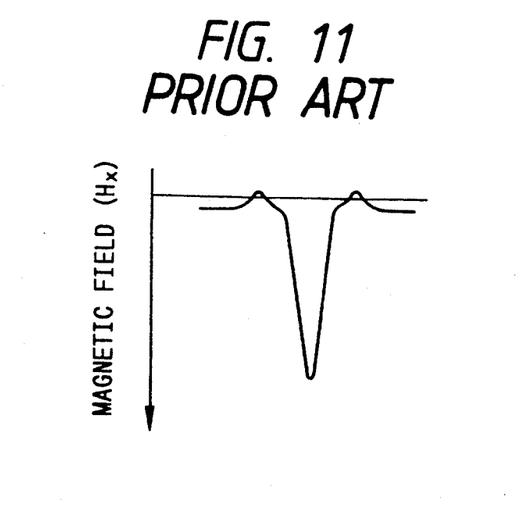
FIG. 11 is a drawing showing the distribution of the recording magnetic field.
Figure 12:
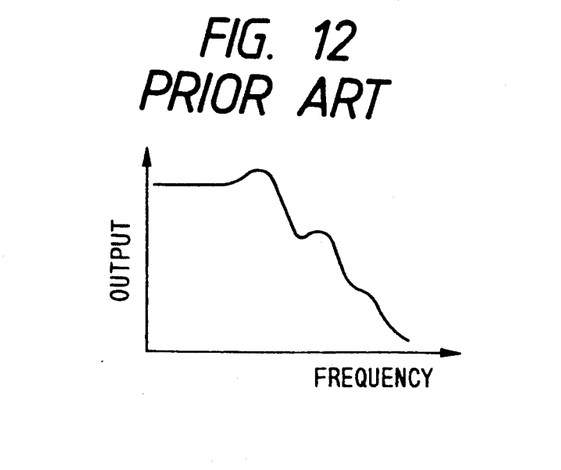
FIGS. 12 and 13 are drawings respectively showing the frequency characteristics.
Figure 13:
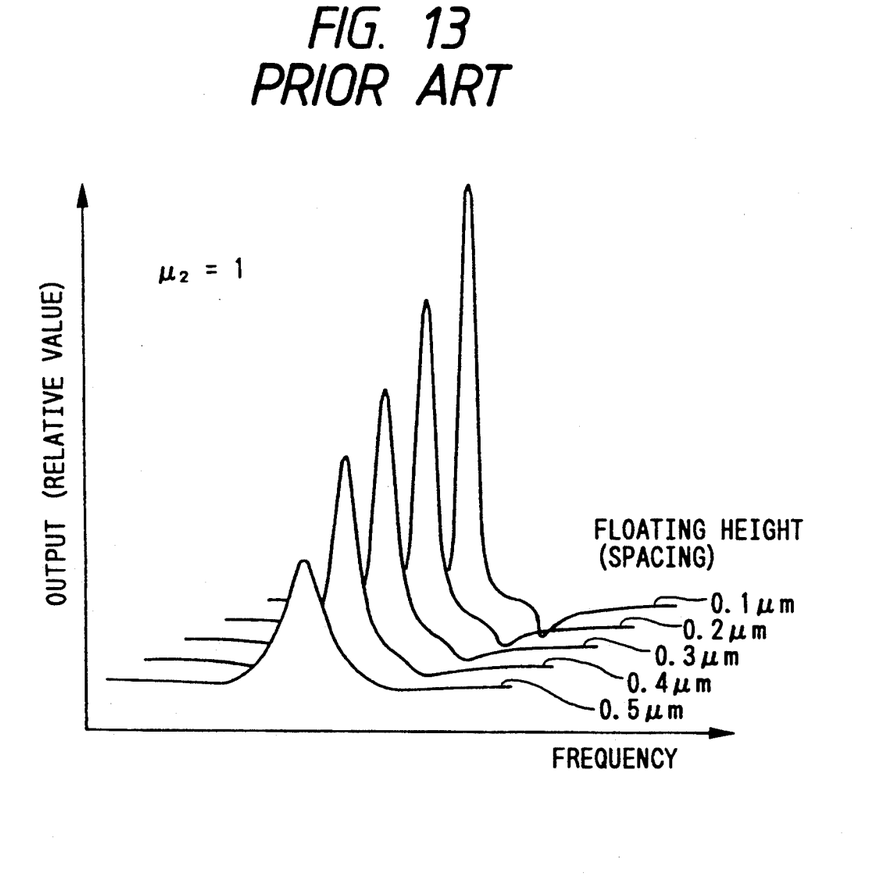

In the thin film magnetic head, each of the magnetic layers 4, 8 has high permeability $\mu_1$, and each of the other portions has low permeability $\mu_2$ (usually $\mu_2 = 1$ in the CGS unit system) as schematically shown in FIGS. 9 and 10. In the distribution of permeability $\mu$, therefore, the permeability abruptly and significantly changes at the magnetic pole ends 12, 13 (the boundaries between the insulating layer 3 and the protective layer 9 at the ends of the magnetic layers 4, 8). In the distribution of the magnetic field in the thin film magnetic head, a great dip occurs between the magnetic pole ends 12, 13 as shown in FIG. 11. In addition, since the magnetic pole ends 12, 13 are parallel with the gap 5, a pseudo-gap is produced between the magnetic pole ends 12, 13, and a so-called contour effect is remarkably produced. A wavy phenomenon consequently occurs in the frequency characteristics, as shown in FIGS. 12 and 13. The error rate is thus increased due to the adverse effect on the adjacent waveforms, thereby producing a trouble in making an attempt to increase the recording density.

The present invention has been achieved in consideration of the above situation, and it is an object of the invention to provide a thin film magnetic head which allows an attempt to further increase the recording density.

The present invention provides a thin film magnetic head comprising an insulating layer, a lower magnetic layer, a gap layer, an upper magnetic layer and a protective layer, all of which are laminated in turn on the surface of a substrate, wherein the insulating layer and the protective layer are made of a magnetic material or a non-magnetic material containing a magnetic material.

In the thin film magnetic head of the present invention, the insulating layer and the protective layer which are adjacent to the lower magnetic layer and the upper magnetic layer, respectively, are made of a magnetic material or a non-magnetic material containing a magnetic material so that each of the insulating layer and the protective layer has a higher value of permeability than that of a conventional layer made of a non-magnetic material. Differences in permeability at the magnetic pole ends are thus decreased, as compared with conventional magnetic heads. As a result, a dip in the magnetic field between the magnetic pole ends is cancelled so that the contour effect is inhibited, and the wavy phenomenon in the frequency characteristics is cancelled.

BRIEF DESCRIPTION OF THE DRAWINGS

FIGS. 1 to 6 are drawings for explaining a thin film magnetic head in accordance with an embodiment of the present invention, in which:

FIGS. 7 to 13 show an example of conventional thin film magnetic heads, in which:

DESCRIPTION OF THE PREFERRED EMBODIMENT

A thin film magnetic head in accordance with an embodiment of the present invention is described below with reference to FIGS. 1 to 4.

The thin film magnetic head of this embodiment has the same structure as that of the conventional magnetic head shown in FIGS. 7 and 8 with the exception that both the insulating layer 3 and the protective layer 9 are made of a feeble magnetic material (for example, Ni-Zn ferrite) or a nonmagnetic material containing a magnetic material (for example, $Al_2O_3$ containing Ni, Co, Fe or the like). The insulating layer 3 and the protective layer 9 may be produced by directly sputtering the above material used as a target on the surfaces of the substrate 1 and of the upper magnetic layer 8.

Figure 2:
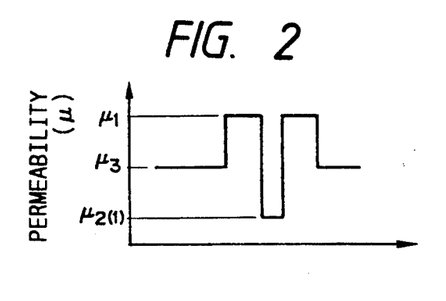
FIG. 2 is a drawing showing the distribution of permeability of the same thin film magnetic head.
Figure 3:
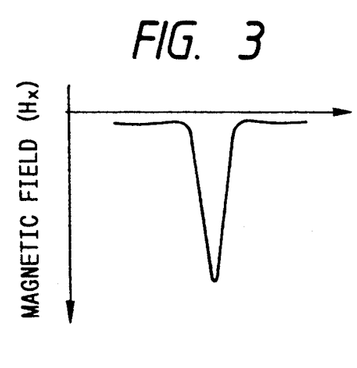
FIG. 3 is a drawing showing the distribution of the recording magnetic field.
Figure 4:
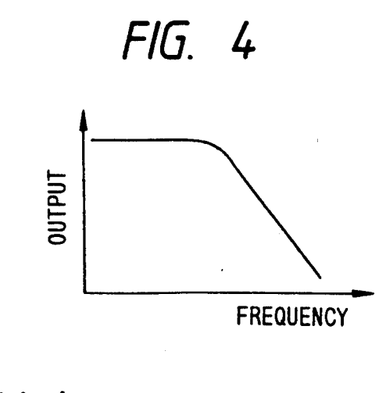
FIG. 4 is a drawing showing the frequency characteristics.
Figure 5A:
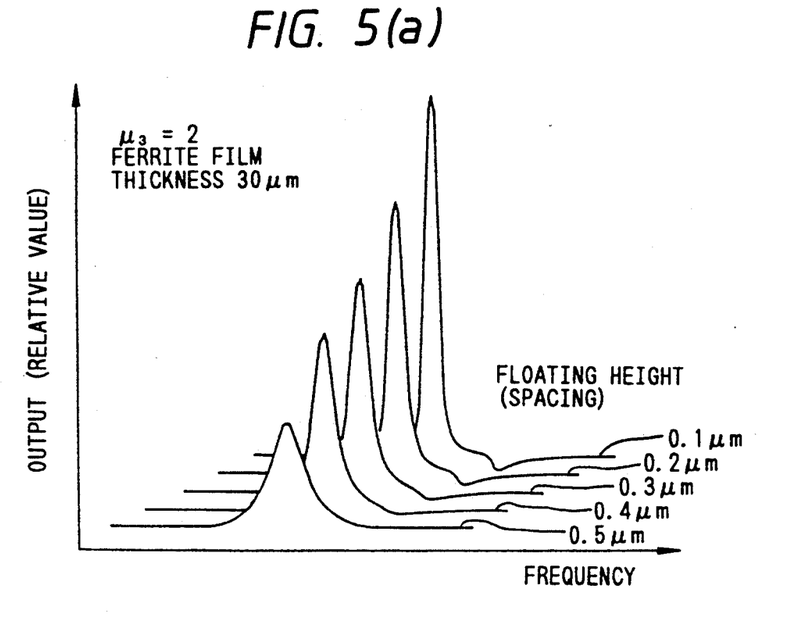
FIG. 5(a) to 5(c) are drawings respectively showing the output waveforms produced when the permeability is changed, while the thickness of a ferrite film is kept constant.
Figure 5B:
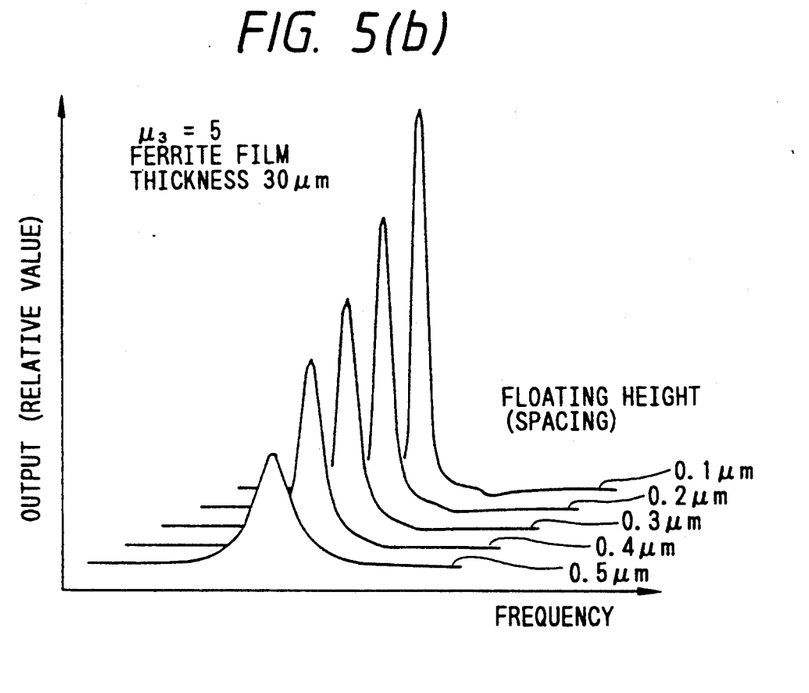
Figure 5C:
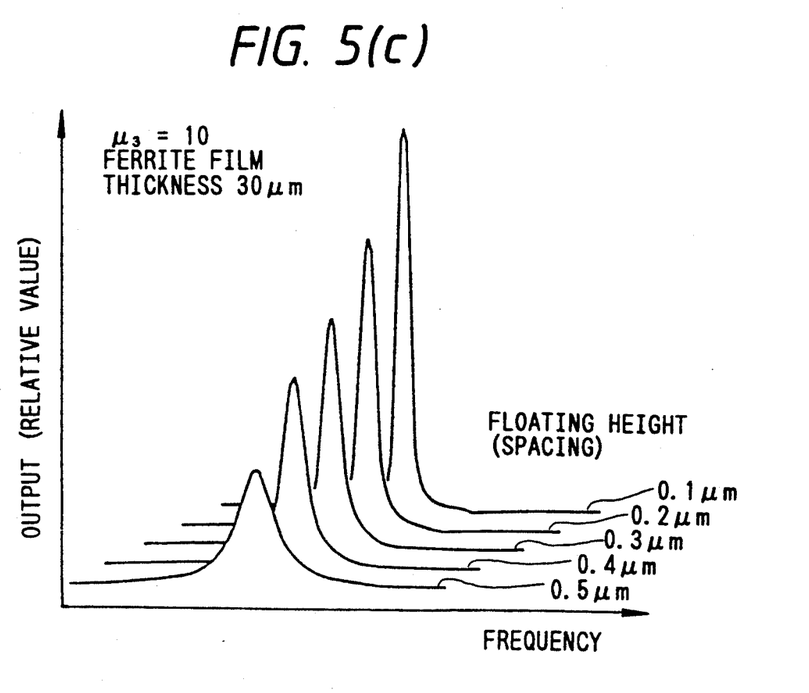
Figure 6A:
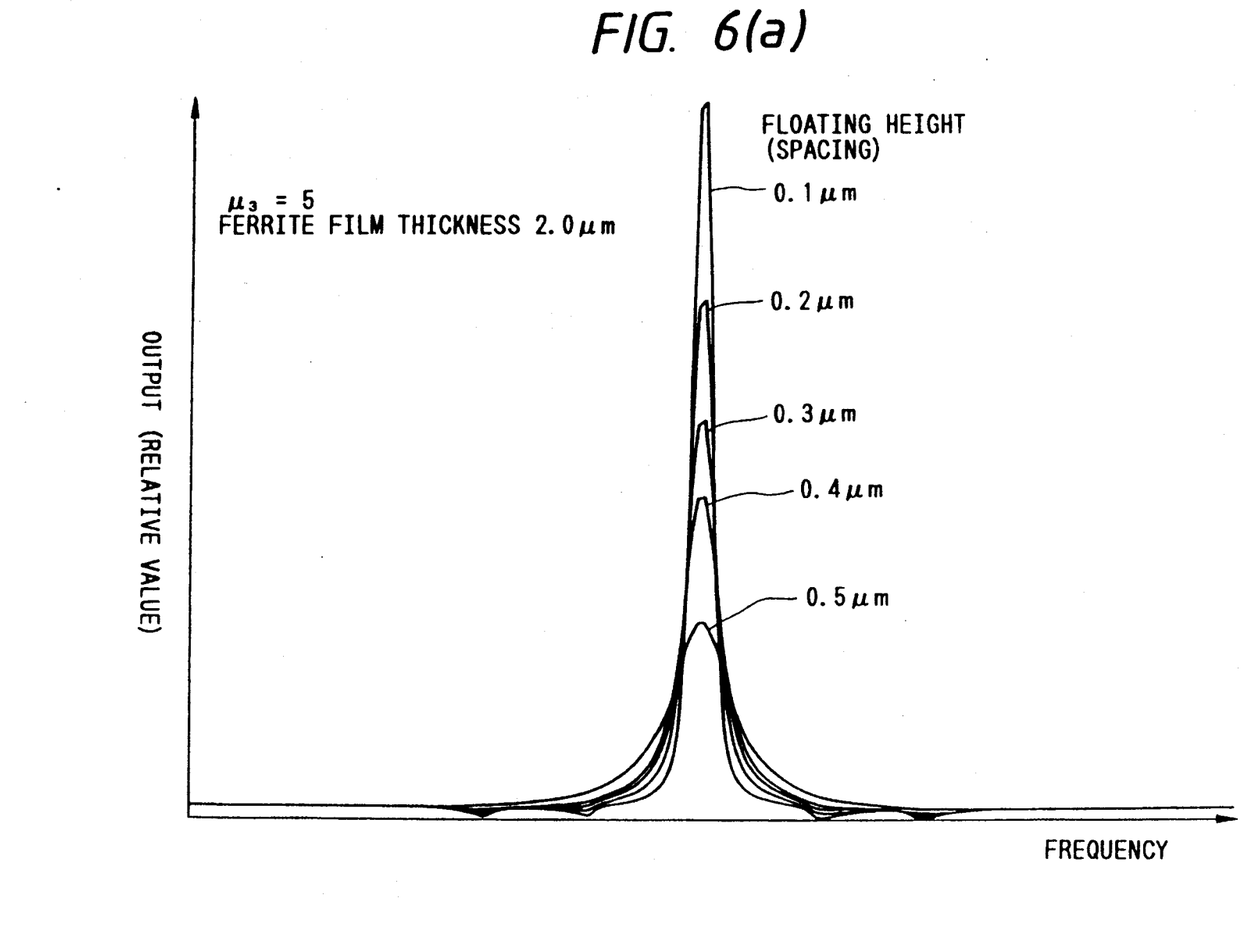
FIGS. 6(a) to 6(d) are drawings respectively showing the output waveforms when the thickness is changed, while the permeability is kept constant.
Figure 6B:
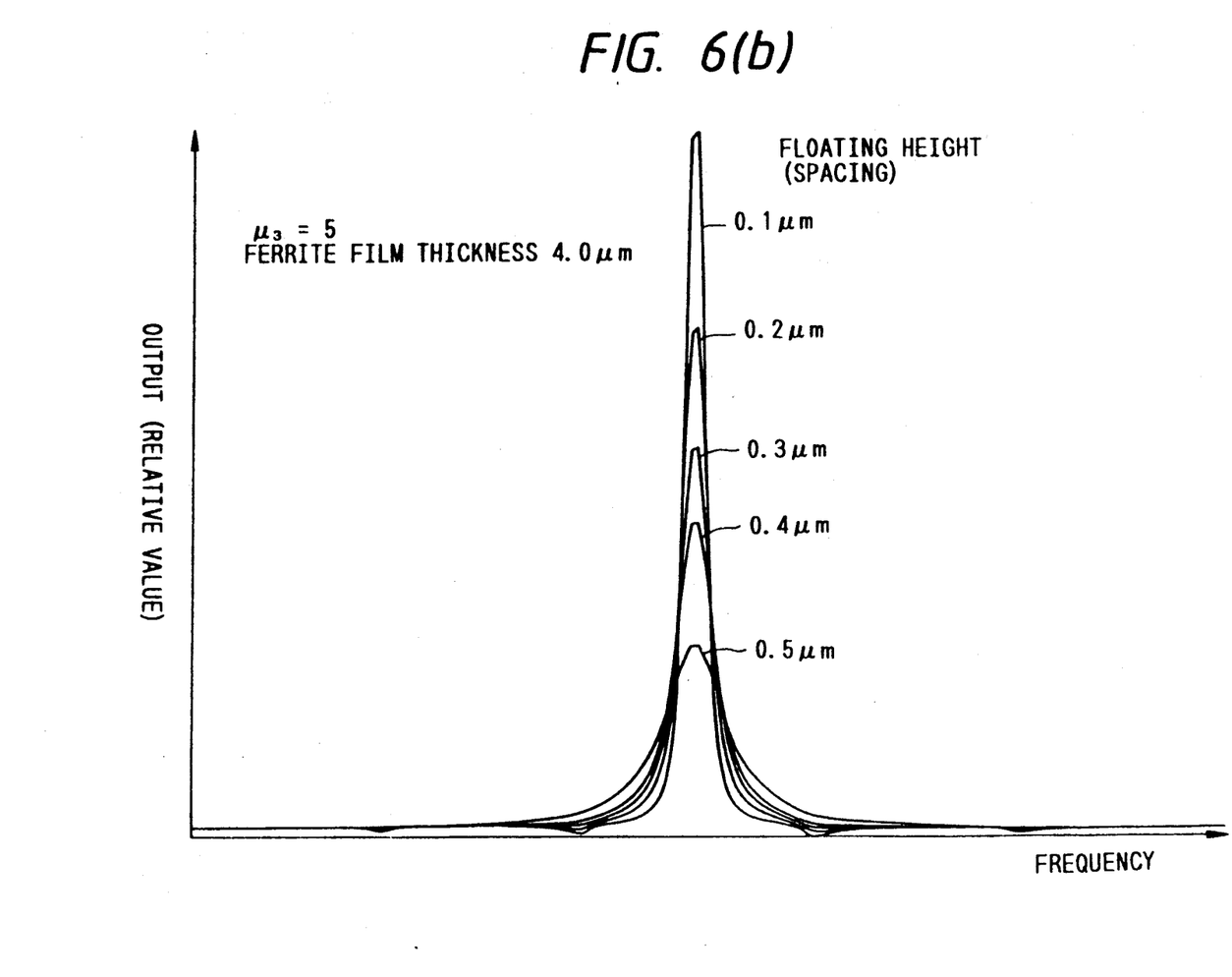
Figure 6C:
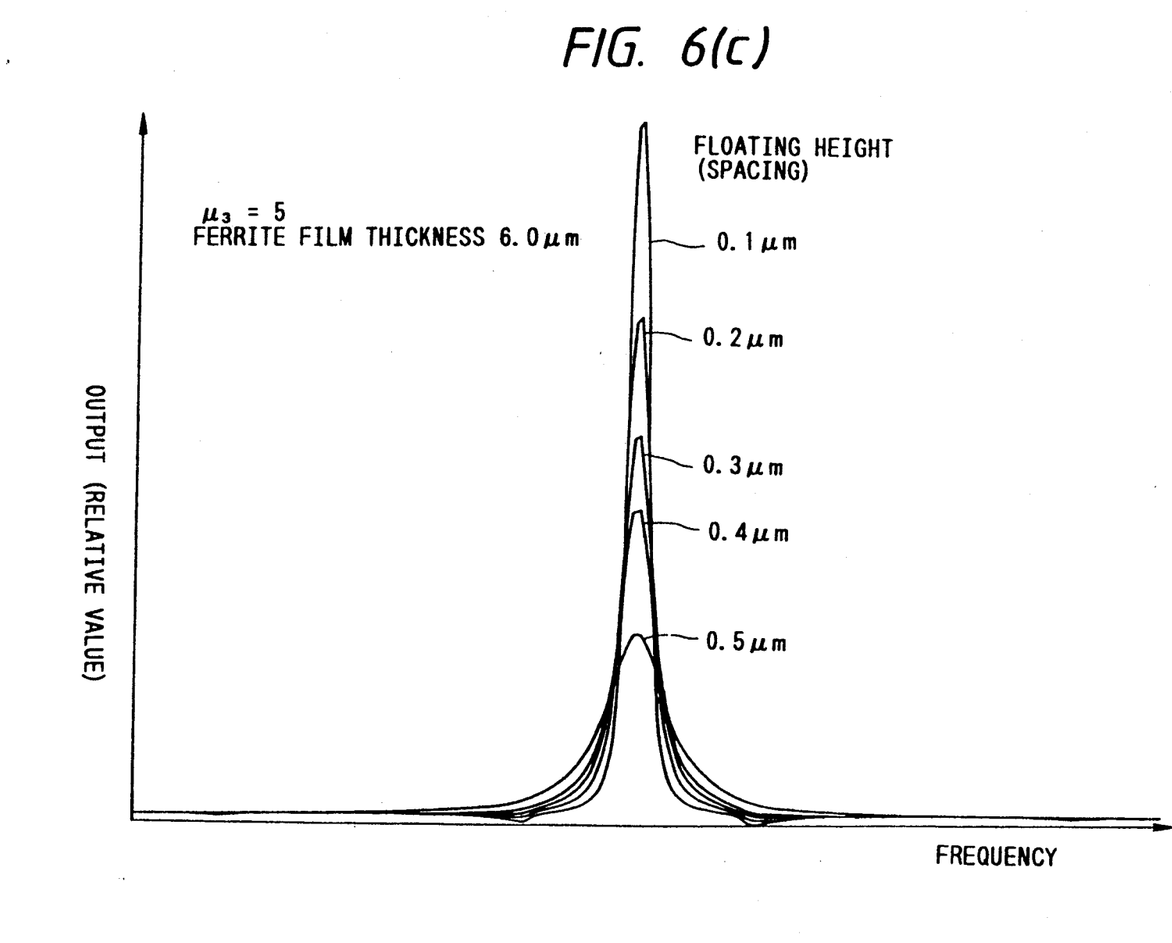
Figure 6D:
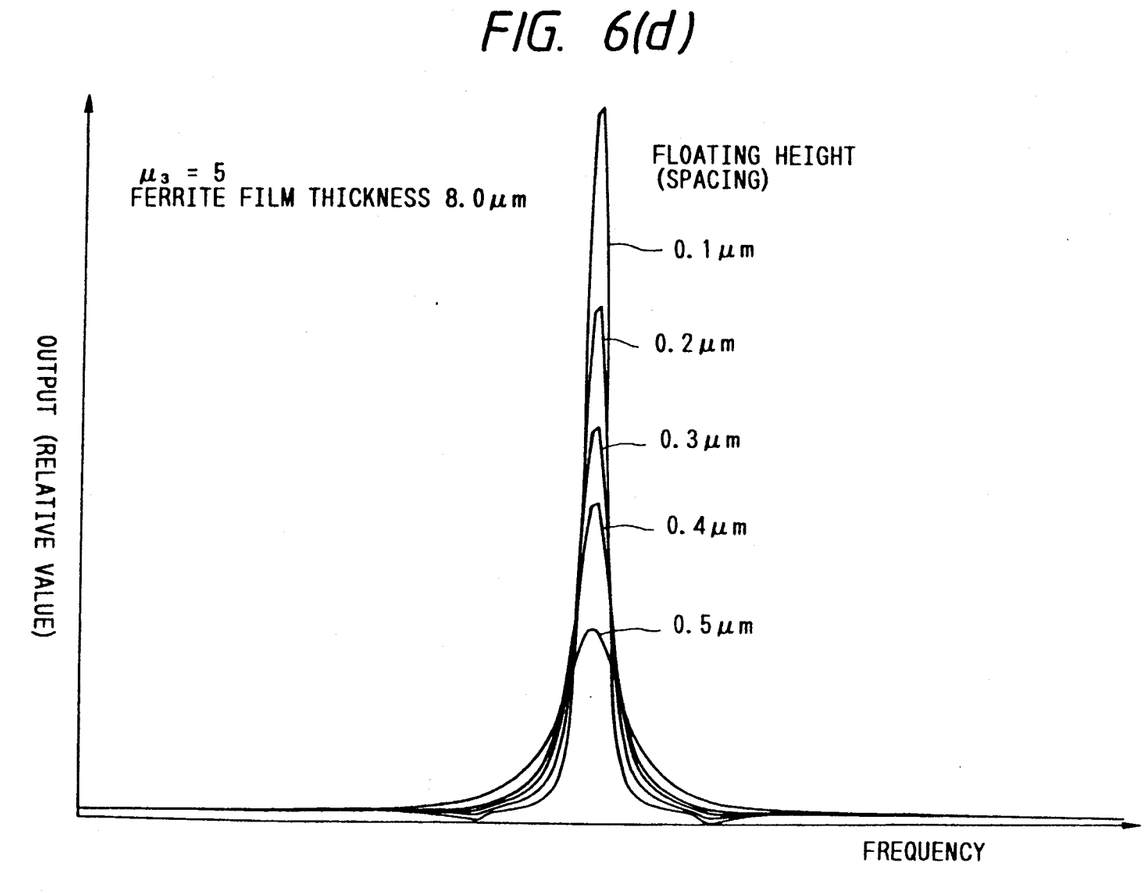

In the thin film magnetic head, because the insulating layer 3 and the protective layer 9 are made of the above material, the permeability value $\mu_3$ of each of the insulating layer 3 and the protective layer 9 is higher than the layer formed by a non-magnetic material, as shown in FIG. 2. As a result, a difference in permeability at the interface between the insulating layer 3 and the lower magnetic layer 4 and a difference in permeability at the interface between the upper magnetic layer 8 and the protective layer 9 are of course decreased, as compared with those of a conventional magnetic head. This prevents the occurrence of a dip in the recording magnetic field which occurs in a conventional magnetic head as shown in FIG. 3. The contour effect remarkably produced in the conventional magnetic head is thus inhibited, and the waviness in the frequency characteristics shown in FIG. 4 is consequently removed, thereby obtaining excellent frequency characteristics. The adverse effect on the adjacent waveforms is thus removed, whereby an attempt can be made to further increase the recording density.

As described in detail above, the thin film magnetic head of the present invention comprises the insulating layer and the protective layer, both of which are made of a magnetic material or a nonmagnetic material containing magnetic material. A difference in permeability between the insulating layer and the lower magnetic layer and a difference in permeability between the protective layer and the upper magnetic layer are thus decreased. This prevents the occurrence of a dip in the recording magnetic field, thereby inhibiting the contour effect. It is therefore possible to obtain excellent frequency characteristics and make an attempt to further increase the recording density.

A description will be now made of an embodiment in which both the insulating layer 3 and the protective layer 9 are made of ferrite.

The insulating layer 3 and the protective layer 9 both of which are made of ferrite may be produced by sputtering ferrite directly on the surface of the substrate 1 and of the upper magnetic layer 8. Each of the insulating layer 3 and the protective layer 9 preferably has a thickness of about 2 to 30 $\mu$m and permeability $\mu_3$ which is set to a value of about 2 to 20. Each of the lower and upper magnetic layers 4 and 8 preferably has a thickness of about 1 to 2 $\mu$m, a permeability value $\mu_1$ of about 1,000 to 3,000 and a gap length of about 0.2 to 1.0 $\mu$m.

When the protective layer 9 must be made of ferrite with transparency, garnet ferrite or the like may be used.

Figure 1:
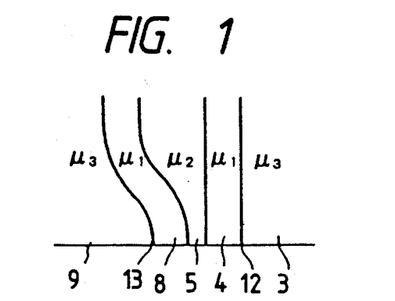
FIG. 1 is a schematic drawing of a principal portion of the thin film magnetic head shown in FIG. 1.

In the above thin film magnetic head, the insulating layer 3 and the protective layer 9 are made of ferrite so that the permeability value $\mu_3$ of each of the layers is about 2 to 20 which is higher than the layer made of a nonmagnetic material. The difference in permeability between the insulating layer 3 and the lower magnetic layer 4 and a difference in permeability between at the magnetic pole ends 12, 13 are thus decreased as compared with the difference in a conventional head, as shown in FIGS. 1 and 2. This inhibits the contour effect and cancels the wavy phenomenon in the frequency characteristics shown in FIG. 4, thereby obtaining excellent frequency characteristics.

FIGS. 5 and 6 show the results of simulation of the waveforms output from the thin film magnetic head configured as described above, FIG. 5 shows the output waveforms when the permeability $\mu_3$ is changed with the ferrite film thickness of 30 $\mu$m. In the drawing, (a), (b) and (c) show cases in which $\mu_3=2$, 5 and 10, respectively. In any one of the cases, the floating height (spacing) is changed from 0.1 $\mu$m to 0.5 $\mu$m. As seen from FIG. 5, the greater the value of permeability $\mu_3$ is and the lower the floating height (spacing) is, the more remarkable the effect of improving a dip in an output waveform becomes. Particularly, it is found that when $\mu_3=10$, no dip occurs in the output waveforms.

FIG. 6 shows the output waveforms when the thickness is changed, while the ferrite permeability $\mu_3$ is constant at 5. In the drawing, (a), (b), (c) and (d) show cases in which the thickness is 2.0 $\mu$m, 4.0 $\mu$m, 6.0 $\mu$m and 8.0 $\mu$m, respectively. As seen from FIG. 6, if the floating height (spacing) is low, the effect of improving a dip becomes remarkable as the thickness is increased.

If the permeability value $\mu_3$ is excessively increased, since the magnetic flux which intrinsically passes through the core bypasses the insulating layer 3 and the protective layer 9, the characteristics of the thin film magnetic head deteriorate. The upper limit of the permeability value $\mu_3$ is preferably about 20, as described above.

As described above, in the thin film magnetic head comprising the insulating layer 3 and the protective layer 9, both of which are made of ferrite, a dip is inhibited from occurring in the output waveform by inhibiting the contour effect, and excellent frequency characteristics without waviness can thus be obtained. It is therefore possible to remove the adverse effect on the adjacent waveforms and make an attempt to further increase the recording density.

As described in detail above, the thin film magnetic head of the present invention comprises the insulating layer and the protective layer, both of which are made of ferrite, so that differences in permeability at the magnetic pole ends are decreased. The contour effect is thus inhibited, and excellent frequency characteristics can be obtained The improving effect is remarked in a case of low floating which is caused by an increase in the recording density. As a result, the thin film magnetic head has the effect of allowing an attempt to be made to further increase the recording density.

What is claimed is:

1. A thin film magnetic head comprising an insulating layer, a lower magnetic layer, a gap layer, an upper magnetic layer and a protective layer, all of which are laminated in turn on the surface of a substrate, wherein said insulating layer and said protective layer are made of a magnetic material or a nonmagnetic material containing a magnetic material.

2. A thin film magnetic head according to claim 1, wherein said insulating layer and said protective layer are made of ferrite.

3. A thin film magnetic head according to claim 2, wherein each of said insulating layer and said protective layer has a thickness of 2 to 30 $\mu$m.

4. A thin film magnetic head according to claim 2, wherein each of said insulating layer and said protective layer has a permeability value of 2 to 20.

* * * * *